3,182,501
FLOW MEASURING APPARATUS
Elmer A. Haase, South Bend, Ind., assignor to The Bendix Corporation, South Bend, Ind., a corporation of Delaware
Filed May 18, 1962, Ser. No. 195,691
2 Claims. (Cl. 73—207)

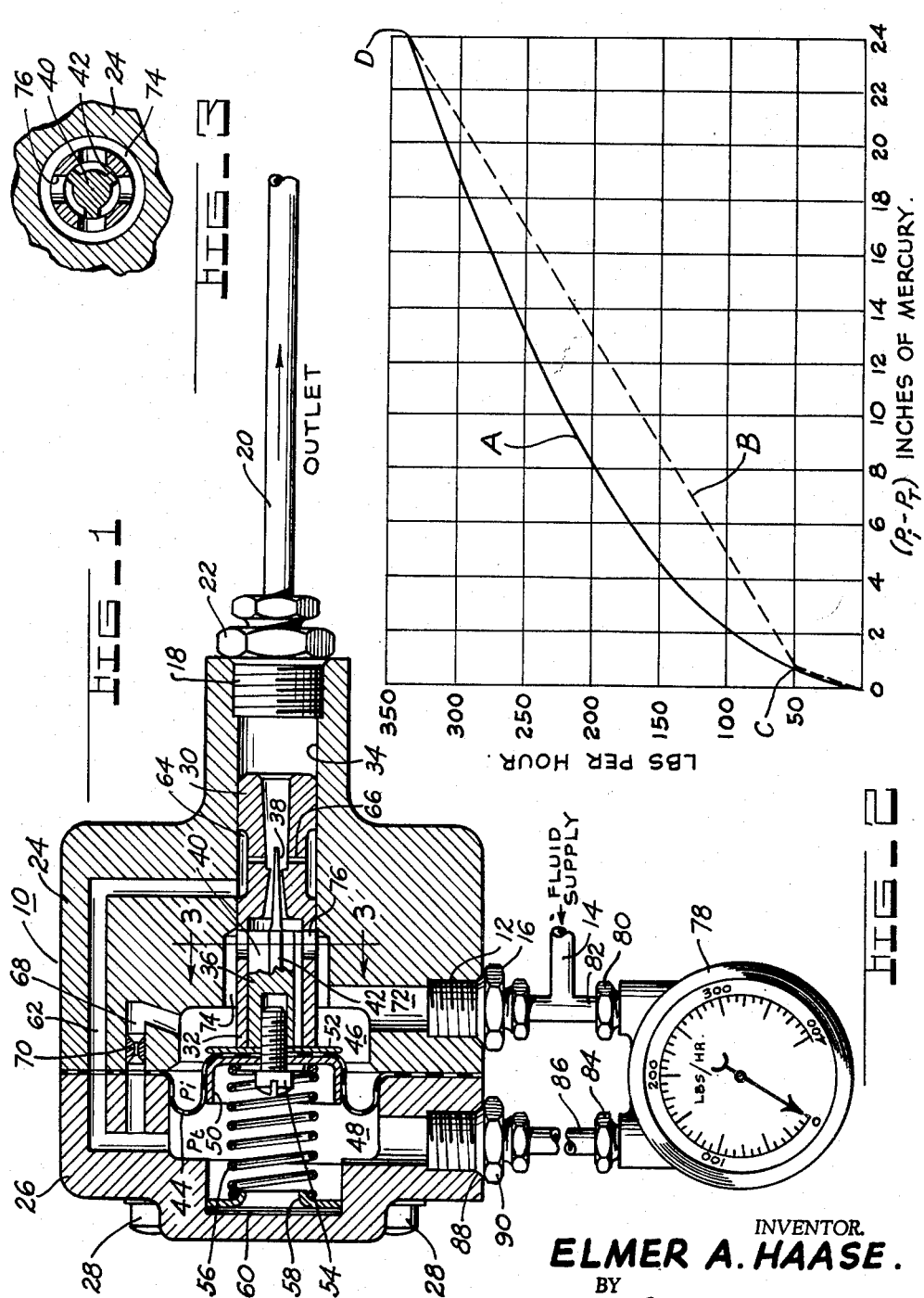

This invention relates to a fluid flow measuring device and, in particular, to a fluid flow measuring device of the orifice type.

Fluid flow meters of the orifice type, such as venturi flow meters, make use of the pressure drop created by the fluid flowing through the orifice or venturi to provide the actuating signal to a pressure differential responsive gauge which, in turn, is suitably calibrated to indicate fluid flow in turns of lbs./hr. or the like. However, one disadvantage of such fluid flow meters results from the relationship between fluid flow through the orifice or venturi and the resulting pressure drop thereacross, which relationship follows the well known square law. As a result of the square law relationship, it follows that a large flow change results in a relatively small pressure drop change when operating in the lower portion of the total flow range whereas the same change results in a relatively larger pressure differential change when operating in the higher portion of the total flow range. The non-linear relationship of flow vs. pressure differential is very undesirable since it precludes the use of a simple pressure differential gauge without undue complications in calibration of the same and/or added mechanism to compensate the pressure differential signal supplied to the gauge. It is therefore an object of the present invention to provide a simple flow meter of the orifice type having a substantially linear pressure differential vs. fluid flow relationship.

It is another object of the present invention to provide a simple and inexpensive fluid flow meter of the orifice type wherein the pressure drop resulting from fluid flow through the orifice is supplied directly to a simple pressure differential gauge having a substantially linear calibration in terms of fluid flow.

Another important object of the present invention is to provide an accurate fluid flow meter which may be quickly and easily installed in its operating environment without undue calibration complications.

Other objects and advantages of the present invention will become apparent from the following description taken in conjunction with the drawings wherein:

FIGURE 1 represents a sectional view of flow measuring apparatus embodying applicant's invention;

FIGURE 2 is a plot of fluid flow in lbs./hr. vs. venturi pressure differential $P_i-P_t$; and FIGURE 3 is a sectional view taken on line 3—3 of FIGURE 1.

Referring to FIGURES 1, 2 and 3 of the drawings, numeral 10 designates a casing having an outlet port 12 to which a fluid supply conduit 14 is joined by a coupling 16 and an outlet port 18 to which an outlet conduit 20 is joined by a coupling 22. The casing 10 has two sections 24 and 26 which are joined by suitable fastening members such as bolts 28 only the heads of which are visible in FIGURE 1.

A venturi member 30 provided with an axially extending sleeve portion 32 at the inlet end thereof is secured in a bore 34 by any suitable means such as a press fit. A valve member 36 having a tapered end portion 38 extending into the throat of venturi member 30 is provided with a fluted body portion 40 having circumferentially spaced axially extending flutes 42. The valve member 36 is slidably carried within the sleeve portion 32.

A flexible diaphragm 44 clamped at its radially outermost portion between casing sections 24 and 26 is responsive to the differential derived from pressures $P_1$ and $P_t$ in fluid chambers 46 and 48, respectively. The central portion of diaphragm 44 is clamped between a spring retaining member 50 and a backup washer member 52 by a bolt 54 which extends through member 50, diaphragm 44 and member 52 into threaded engagement with the body portion 40 of valve member 36. A spring 56 interposed between spring retainer member 50 and a spring retaining member 58 supported by casing section 26 preloads the valve member 36 and attached diaphragm 44 causing the same to assume a fixed position by virtue of washer member 52 engaging the end of sleeve portion 32. The spring preload may be varied for calibration purposes by adding or removing shims 60 disposed between spring retaining member 58 and casing section 26.

The chamber 48 receives fluid at venturi throat pressure $P_t$ via passage 62 in casing 10 and annulus 64 and radial passages 66 in venturi member 30. A passage 68 having a restriction 70 removably secured therein communicates chamber 46 with passage 62.

The chamber 46 is vented to fluid at inlet pressure $P_1$ which flows from inlet port 12 through an inlet passage 72 into an enlarged diameter portion 74 of bore 34 from which the fluid flows through circumferentially spaced openings 76 in sleeve portion 32 and the fluted body portion 40 thence through the venturi 30 and bore 34 to the outlet port 18.

A conventional fluid pressure differential responsive gauge 78 calibrated in terms of lbs./hr. of fluid flow is provided with a high pressure tap 80 communicating with supply conduit 14 at pressure $P_1$ via conduit 82. A low pressure tap 84 communicates with chamber 48 at venturi throat pressure $P_t$ via a conduit 86 connected to port 88 in casing section 26 by threaded coupling 90.

Operation

Referring to FIGURE 2, curve A designates the square law relationship between fluid flow in lbs./hr. and venturi pressure differential $P_i-P_t$ in inches of mercury over a range of flows from 0 lbs./hr. to approximately 350 lbs./hr. when the venturi 30 is unrestricted in the customary manner. It will be understood that a range of 0 to 350 lbs./hr. flow is used for illustration and explanation only and the present invention may be used with equally good results over any desired range of flows. The second curve identified by letter B in FIGURE 2 represents the proportional relationship between fluid flow and venturi pressure differential obtained by applicant's invention.

The venturi 30 is selected with a throat area which at the maximum flow of 350 lbs./hr. will give the desired maximum pressure differential for the pressure differential responsive gauge which registers flow in lbs./hr. Now, assuming that no flow exists through the venturi 30, the various component parts of applicant's invention will occupy the positions shown in FIGURE 1 under which condition the venturi throat area is at a minimum.

With an increase in fluid flow through venturi 30, a venturi pressure differential $P_i-P_t$ is generated which with increasing flow follows the solid line curve A. Upon reaching a flow of approximately 50 lbs./hr. as represented by point C on curve A, the corresponding pressure differential $P_i-P_t$ reaches a value which, in acting upon the effective area of diaphragm 44, produces a force that overcomes the force of spring 56. As flow increases the pressure differential $P_i-P_t$ increases accordingly, the spring 56 is progressively compressed to a certain degree depending upon the rate of spring 56 which, in turn, causes valve member 38 to move axially thereby effecting a progressive increase in the throat area of venturi 30. The change in throat area of venturi 30 for a given displacement of valve member 38 depends upon the contour of valve 38, which valve in the case of the proportional relationship illustrated by curve B, is circular in cross section and tapered axially to thereby effect a change in venturi throat area proportional to the axial displacement of valve member 38. Since the pressure differential $P_i-P_t$ varies as a function of the throat area of venturi 30 as well as flow through venturi 30 and the valve member 38 is positioned as a function of the pressure differential $P_i-P_t$ across diaphragm 44, it follows that the pressure differential $P_i-P_t$ is modified continuously as flow increases from point C to the upper limit of the range of flow, approximately 350 lbs./hr. the latter limit being defined by point D.

The pressure differential $P_i-P_t$ is vented to gauge 78 via ports 80 and 84 which gauge is calibrated with equally spaced lines representing lbs./hr. fluid flow over a range of 0 to 400 lbs./hr.

The relationship defined by curve B can be modified to be linear over a portion of the flow range and nonlinear over another portion of the flow range by suitable modification of the contour of valve member 38, as desired. Also, the point C on curve A which represents the flow and pressure differential at which spring 56 is overcome by the pressure differential $P_i-P_t$ may be changed by adding or subtracting shims 60 to thereby modify the spring loading against diaphragm 44, by installing a spring 56 having the desired rate, and/or by installing a diaphragm 44 having a predetermined effective area exposed to the pressure differential $P_i-P_t$ to thereby effect a desired force at a particular pressure differential $P_i-P_t$ or flow.

The passage 68 and restriction 70 are provided to permit fluid to enter chamber 48 from chamber 46 when flow is initiated through the venturi 30 to thereby purge the chamber 48 and fluid connections communicating therewith of air or vapor in the low pressure section of the flow meter.

Various other adaptations and modifications of the present invention may be made by those persons skilled in the appropriate art without departing from the spirit of the invention.

I claim:
1. A fluid flow meter for measuring the flow of fluid through a conduit comprising:
   a casing having an inlet and an outlet;
   a venturi in series flow relationship with said inlet and outlet through which the fluid flows to generate a fluid pressure differential;
   a flow indicating device responsive to said fluid pressure differential;
   a valve member operatively connected to said venturi for varying the throat area thereof to cause a corresponding variation in the fluid pressure differential-fluid flow relationship associated with said venturi;
   a first fluid chamber communicating with the fluid pressure at the throat of said venturi;
   a second fluid chamber communicating with the fluid pressure upstream from said venturi;
   a movable wall separating said first and second fluid chambers and responsive to the fluid pressure differential therebetween and being operatively connected to said valve member for actuating the same at a predetermined value of said fluid pressure differential to cause an increase in the throat area of said venturi;
   a resilient member operatively connected to said movable wall for urging said valve member toward a closed position in opposition to said fluid pressure differential and for establishing a force to be overcome by said predetermined pressure differential; and
   a fixed stop member engageable with said movable wall for limiting the movement of said valve member in a closing direction to a predetermined position.

2. A fluid flow meter for measuring the flow of fluid through a conduit comprising:
   a casing having an inlet and an outlet;
   a venturi in series flow relationship with said inlet and outlet through which the fluid flows to generate a fluid pressure differential;
   a flow indicating device responsive to said fluid pressure differential;
   a valve member operatively connected to said venturi for varying the throat area thereof to cause a corresponding variation in the fluid pressure differential-fluid flow relationship associated with said venturi;
   a first fluid chamber communicating with the fluid pressure at the throat of said venturi;
   a second fluid chamber communicating with the fluid pressure upstream from said venturi;
   a movable wall separating said first and second fluid chamber and responsive to the fluid pressure differential therebetween and being operatively connected to said valve member for actuating the same in response to said fluid pressure differential to cause an increase in the throat area of said venturi;
   a resilient member operatively connected to said movable wall for urging said valve member toward a closed position in opposition to said fluid pressure differential and for establishing a force to be overcome by said fluid pressure differential;
   a fixed stop member operatively connected to said valve member for limiting the movement of said valve member in response to the force of said resilient member in a closing direction to a predetermined position; and
   a restricted passage communicating said first and second fluid chambers.

References Cited by the Examiner
UNITED STATES PATENTS

| 2,367,176 | 1/45 | Ahlstrom et al. | 73—207 X |
| 2,367,544 | 1/45 | Udale | 73—207 |
| 2,816,441 | 12/57 | Ezekiel | 73—207 |
| 2,944,420 | 7/60 | Streeter | 73—209 |

OTHER REFERENCES
German application No. 1,062,443; July 1959.

RICHARD C. QUEISSER, *Primary Examiner.*
ROBERT EVANS, JOSEPH P. STRIZAK, *Examiners.*